United States Patent [19]

Scrivo et al.

[11] Patent Number: 4,695,433
[45] Date of Patent: Sep. 22, 1987

[54] VALVED MIX-HEAD FOR RIM PROCESS

[75] Inventors: Jerry V. Scrivo; Gordon W. Breuker, both of Holland, Mich.

[73] Assignee: Ex-Cell-O Corporation, Troy, Mich.

[21] Appl. No.: 812,049

[22] Filed: Dec. 23, 1985

[51] Int. Cl.⁴ .................. G05D 16/00; G05B 17/00; B01F 15/02
[52] U.S. Cl. .................. 422/112; 422/116; 422/133; 422/135; 137/563; 366/131; 366/134; 366/136; 366/137; 366/159; 366/182
[58] Field of Search ............ 422/133, 135, 112, 116; 366/131, 134, 136, 137, 159, 177, 182, 189, 269; 137/563; 425/130, 200

[56] References Cited

U.S. PATENT DOCUMENTS

| 3,964,731 | 6/1976 | Ernst | 137/563 |
| 4,053,283 | 10/1977 | Schneider et al. | 422/133 |
| 4,175,874 | 11/1979 | Schneider | 366/182 |
| 4,226,543 | 10/1980 | Schlüter | 366/159 |
| 4,279,517 | 7/1981 | Wallner et al. | 366/269 |
| 4,592,657 | 6/1986 | Taubenmann | 366/189 |
| 4,600,312 | 7/1986 | Scrivo | 422/133 |

Primary Examiner—David L. Lacey
Assistant Examiner—Floyd E. Bennett, Jr.
Attorney, Agent, or Firm—John C. Evans

[57] ABSTRACT

A high pressure mix-head for use in reaction injection molding systems includes a full cross section plunger and a piston valve assembly selectively positioned in response to recirculation and pour cycles to control flow through recirculation passages formed on the O.D. surface of a mix-head sleeve.

8 Claims, 5 Drawing Figures

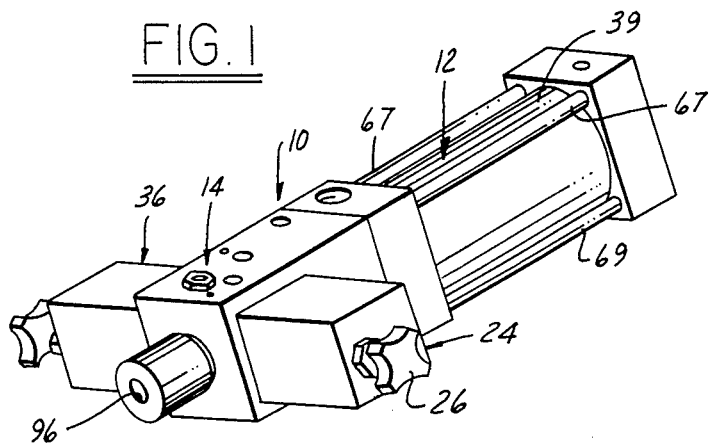
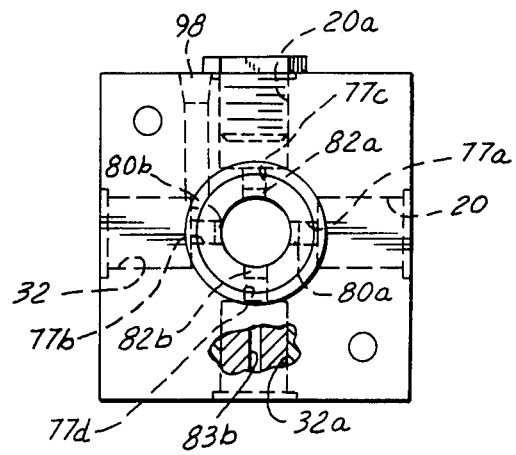
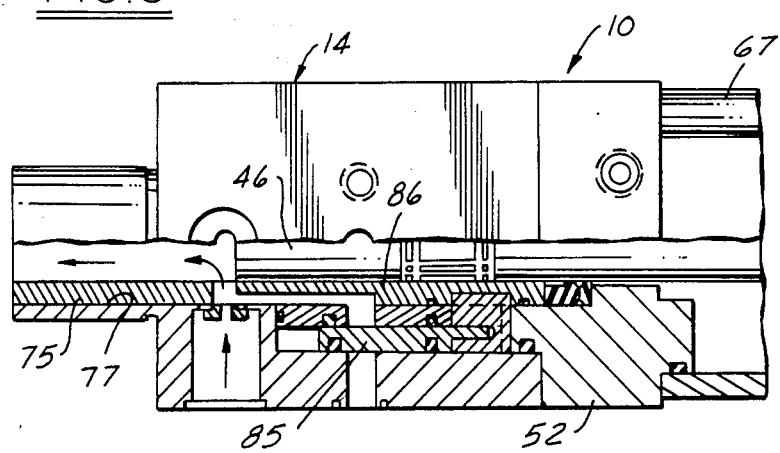

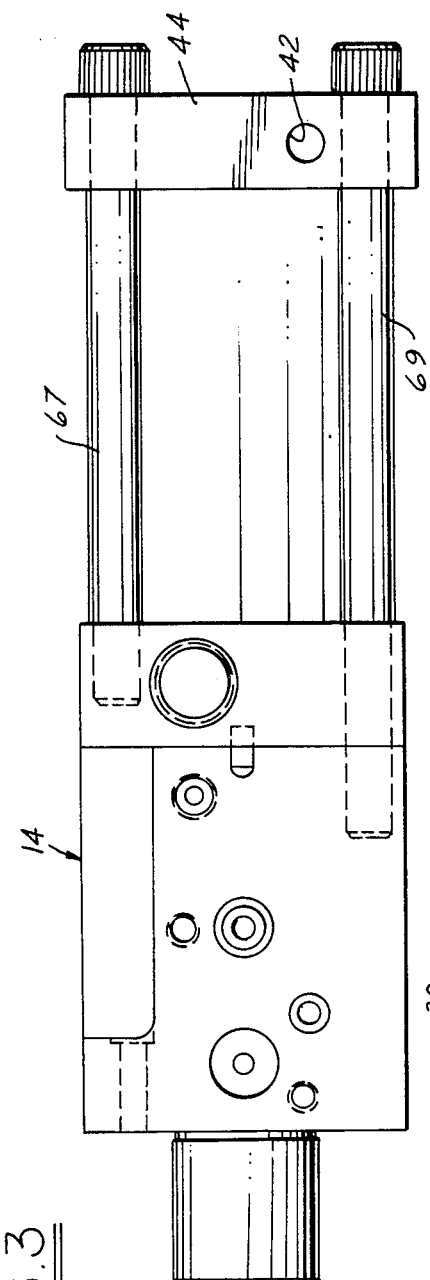
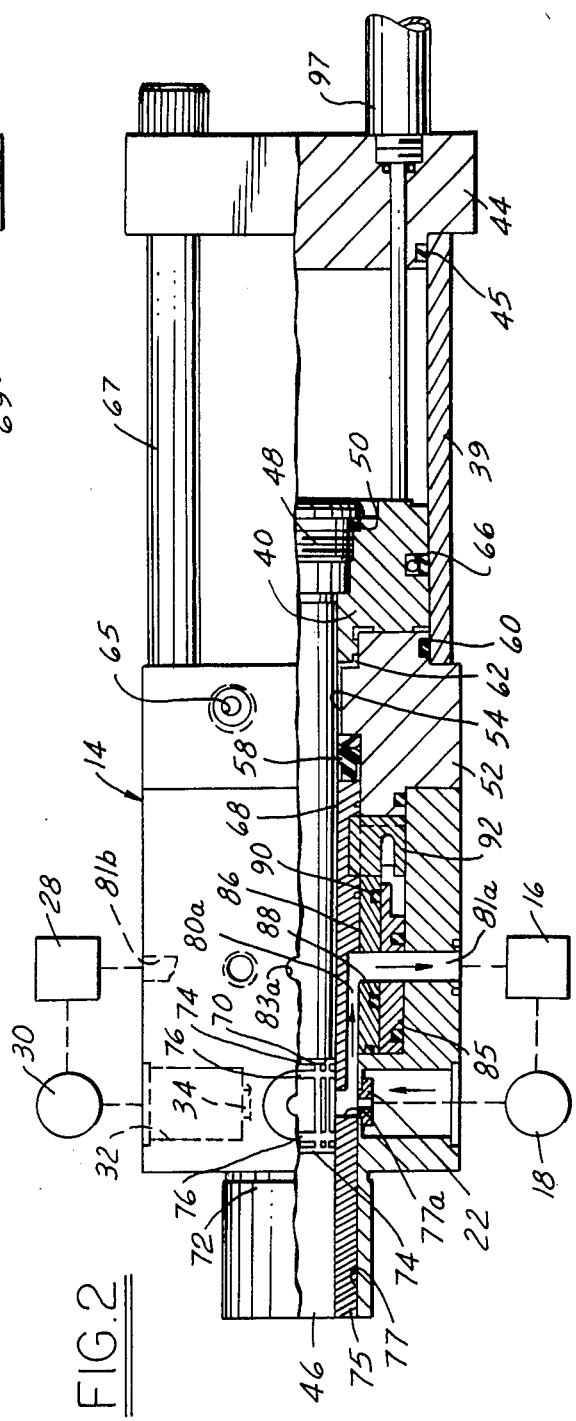
FIG.3
FIG.2

VALVED MIX-HEAD FOR RIM PROCESS

BACKGROUND OF THE INVENTION

This invention relates to mix-heads for two chemically reactive streams and more particularly to such mix-heads for impingement mixing and stream transfer of two or more chemically reactive plastic compositions and wherein the mix-head includes recirculation passages.

Various high pressure mix-heads have been proposed that provide combined recirculation flow and impingement mixing injection and flow from the mix-head to a mold cavity. U.S. Pat. No. 4,175,874 issued Nov. 27, 1979 and U.S. Pat. No. 4,053,283 issued Oct. 11, 1977 disclose such a mix-head wherein the recirculation passages are formed in the piston. U.S. Pat. No. 3,706,515 issued Dec. 19, 1972 utilizes a constant section plunger. A separate movable slide plunger has recirculation paths that are selectively positioned to define a recirculation path between mix-head inlets and recycle outlets.

SUMMARY OF THE INVENTION

An object of the present invention is to provide an improved high pressure mix-head with a movable slide plunger of constant diameter and a mix-head body or sleeve which has fixed location, internal two-stream recirculation paths through which material recirculation is controlled by a separately movable valve piston element.

Another object of the present invention is to provide a mix-head of the preceding object and wherein the valve piston is hydraulically operated in response to positioning of the slide so as to permit recirculation of all streams prior to mixing and simultaneous injection of material into a mold during a fill cycle. On completion of injection the slide plunger returns to its initial position to displace previously mixed material in the mix-head into the mold cavity.

Still another object of the present invention is to provide a mix-head as set forth in either of the preceding objects wherein a fixed sleeve includes a pair of diametrically spaced longitudinal passages that are intersected by inlet and return ports which are selectively communicated in accordance with the axial position of a separate piston valve movably supported within the mix-head body.

In a preferred embodiment the mix-head includes a slide plunger having a driven end connected to a drive piston in a drive cylinder. The drive cylinder has an extension connected to a mix-head body. The mix-head body has at least first and second inlets respectively connected to sources of first and second chemically reactive plastic compositions. The mix-head body further includes first and second return ports respectively connected to first and second reservoirs for each of the compositions. The slide plunger is of constant diameter and reciprocates between mix and rest positions. When the plunger is positioned in its rest position it blocks communication between the aforesaid inlets and the mix chamber. A separate piston valve opens sleeve passages so that two separate compositions can be recirculated through separate bypass loops.

Other objects and advantages and a more complete understanding of the invention will be apparent to those skilled in the art from the succeeding detailed description of the invention and the accompanying drawings thereof.

BRIEF DESCRIPTION OF THE DRAWINGS

FIG. 1 is a perspective view of a multiple-stream mix-head including the present invention;

FIG. 2 is a longitudinal cross-sectional view of the mix-head of FIG. 1 showing a recirculation mode;

FIG. 3 is a side elevational view of the mix-head;

FIG. 4 is an end elevational view at the outlet of the mix-head head; and

FIG. 5 is a fragmentary view of the mix-head plunger in its mixing mode position.

DESCRIPTION OF THE PREFERRED EMBODIMENT

In FIGS. 1-4 a mix-head assembly 10 is illustrated for mixing and feeding multiple reactive chemical compositions. The assembly 10 is of modular construction including a hydraulic drive 12 and a mix-head body 14. The assembly 10 is supplied with multiple chemical compositions, for producing moldings by an isocyanate poly addition process. One composition is stored in a reservoir 16. A pump 18 draws material from reservoir 16 to a first mix-head inlet 20 which may have a metering orifice 22 therein. If desired (and as shown in FIG. 1), the fixed metering orifice 22 can be replaced by a variable flow needle valve assembly 24 as shown in the FIG. 1 embodiment. In such case, adjustment of handle 26 will vary the proportional flow of the first composition to the mix-head. A second composition is stored in a reservoir 28. A pump 30 draws material from reservoir 28 to a second mix-head inlet 32 which has a metering orifice 34 therein which can be replaced by a variable flow needle valve assembly 36 like assembly 24 and serving the same purpose upon adjustment of its handle 38. In the illustrated embodiment two other mix-head inlets 20a and 32a are provided. They are shown plugged, it being recognized that if desired they can be associated with sources of third and fourth compositions and with systems for selectively controlling their flow through the mix-head.

The hydraulic drive 12 includes a cylinder 39 having a piston 40 reciprocated therein by hydraulic flow through a port 42 in a cylinder head 44. Cylinder head 44 has an annular seal 45 which engages the cylinder 39 to prevent leakage of fluid.

The piston 40 is connected to one end of a constant diameter slide plunger 46 by a rod retainer plug 48 that carries a fluid sealing O-ring 50. A cylinder base 52 has a longitudinally directed bore 54 formed therethrough for the plunger 46. A plurality of annular seal elements 56, 58, 60 seated in cylinder base 52 seal an inboard cylinder chamber 62 which in turn is sealed from the outboard cylinder chamber 64 by a ring seal 66 on the O.D. of piston 40. A hydraulic port 65 communicates with chamber 62 to supply and exhaust drive fluid in a known manner. Cap screws 67 connect the cylinder head 44 to the cylinder base 52 and cap screws 69 connect the mix-head body 14 to the hydraulic drive 12.

The plunger 46 extends through a bore 68 in the mix-head body 14 which is coaxial of bore 54. Bore 68 is of circular cross section and its I.D. is configured to slidingly, sealingly engage the O.D. of the plunger. The O.D. and the circular cross section of the plunger 46 is constant from end to end so as to maximize the structural capacity for a given plunger diameter.

The plunger 46 has grooves 70 on its distal end 72. The grooves 70 are circularly and longitudinally disposed on the distal end and carry O-rings 74, 76 sealingly engaged with the wall of bore 68. These seals are formed in place at assembly by injection of a suitable elastomeric sealing material through access port 98 which is then permanently plugged. A sleeve 75 is supported in a mix-head bore 77. It includes inlets 77a–77d to the bore 68. The sleeve 75 also has diametrically located slots 80a, 80b and 82a, 82b that are formed in the O.D. of the sleeve 75. The slots 80a, 80b and 82a, 82b intersect inlets 77a–77d and are connected to recirculation ports 81a, 81b which communicate with reservoirs 16, 28 and to recirculation ports 83a, 83b which are adapted to be connnected to reservoirs.

The recirculation ports 81a, 81b and 83a, 83b all define separate recirculation paths for each of the multiple compositions. Recirculation is controlled by a piston valve 85 when the mix-head assembly is positioned in the recirculation position of FIG. 2. In this position the piston valve 85 is located in the mix-head to open communication between the inlets 77a–77d and the ports 81a, 81b, 83a and 83b. In this position, the perimeter O-rings 90 are located to seal the bore 68 from the inlets 77a–77d. Also, the ports 81a, 81b and 83a, 83b are opened between the inlets 77a–77d and the reservoirs to define a path for recirculation of the chemical compositions following feed of the previously mixed compositions into the mold. The recirculation paths are sealed from one another by a seal bushing 86 interposed between the sleeve 75 and the I.D. wall of slidable piston valve 85. The bushing 86 carries a pair of spaced annular seals 88, 90 for sealing the recirculation.

Mixing is accomplished when plunger 46 is positioned inboard of the bore 68 as shown in FIG. 5. At the same time the piston valve 85 shift against two diametrically located key members 92. The piston valve 85 shuts off the recirculating streams by blocking ports 81a, 81b and 83a, 83b. The inlets 77a–77d are opened so that streams of chemicals will impact against one another to produce mixing within the bore 68 downstream of the retracted plunger end 94. The mixed constituents are then discharged through an outlet 96 from mix-head body 14 adapted to seat in a mold inlet. The mixed material flow into the mold by flow pressure until a predetermined amount of material has been injected after which the drive is energized by selectively controlling fluid to cause the piston 40 to shift the plunger 46 to the recirculation position in FIG. 2. The return stroke clears the bore 68 and shifts the piston valve 85 from the key members 92 to clear the recirculation paths.

Actuator position sensor 97 senses the position of the actuator piston 40 and provides an adjustable timed shift signal to the solenoid valve which supplies hydraulic fluid to shift piston valve 85 in timed sequence with the slide plunger 46. The ability to adjust the timing of the shift signal in response to material stream pressure trace data allows fine tuning of the mix-head valve functions.

While two chemical streams are discussed, the mix-head assembly can be modified to include three or more sets of operative inlets and recirculation ports if more than two chemical compositions are to be mixed. For example, in the case of three streams, the inlets and outlets can be disposed at points spaced one hundred and twenty degrees. The four-stream mix-head assembly illustrated will have all inlets and recirculation ports connected to a desired chemical stream for mixing in the head.

What is claimed is:

1. A mix-head assembly for combining two or more chemical streams for mixing and discharge into a mold cavity comprising: a mix-head body having a sleeve therein defining a longitudinal mixing bore of constant diameter along the length thereof, said sleeve having a plurality of inlet openings, said mix-head body having a plurality of return ports, each of said inlet openings communicating with said mixing bore to direct a chemical composition stream into said mixing bore, said mixing bore having an outlet end defining a discharge port for flow of a mixture of streams from said mixing bore to a mold cavity, said sleeve having spaced slots in its outer surface in communication with said inlet opening so as to define a return path in said sleeve, a slide plunger of constant diameter along its length in sliding fit relationship with the inside diameter of said bore, a piston valve in surrounding sliding relationship to said plunger and being positioned for opposite reciprocation thereon, said plunger being slidably positioned so as to reciprocate in opposite directions within said bore and being positioned so as to open and close said inlet openings, said piston valve being positioned so as to move in a first direction to cause material to be directed from the mix-head body through said return ports, said piston valve being positioned so as to move in a direction opposite to said first direction to block flow through said return ports so as to cause recirculation flow from each of said inlet openings through one of said slots to one of said return ports.

2. In the assembly of claim 1, further including an annular bushing located in said mix-head body on the outer diameter of said sleeve, means on said bushing for sealing each of said recirculation ports, said piston valve having its inside diameter wall slidably supported on the outer diameter surface of said bushing.

3. In the assembly of claim 1, further including two diametrically located key members in said mix-head body so as to fix sleeve against rotation with respect to said mix-head body, co-acting means on said key members and said piston valve to cause said piston valve to nest within said key members when said recirculation ports are open so as to prevent rotation of said piston valve with respect to said recirculation ports during recirculation of chemical streams therethrough.

4. In the assembly of claim 3, further including an annular bushing located in said mix-head body on the outer diameter of said sleeve, means on said bushing for sealing around each of said recirculation ports, said piston valve having its inside diameter wall slidably supported on the outer diameter surface of said bushing.

5. In the assembly of claim 1, further including an actuator position sensor and adjustable means to cause the piston valve controlling recirculation flow to shift in timed sequence with the position of the slide plunger which controls shot initiation and termination, said actuator position sensor being made so as to adjust timing in response to actual material pressure traces to provide a fine tuning capability for mix-head valve functions.

6. In the assembly of claim 1, further including an access port in said body being positioned so as to form slide plunger seals at assembly by injection.

7. In the assembly of claim 1, further including means forming longitudinal grooves and intersecting circular grooves on an end of said plunger, and seal means in said longitudinal and circular grooves to seal against leakage from said inlet openings when said plunger is positioned to close said inlet openings.

8. In the assembly of claim 7, wherein said mix-head body including means for supplying seal material from exteriorly of said mix-head body into said longitudinal and circular grooves.

* * * * *